United States Patent
Zhao et al.

(10) Patent No.: US 11,733,108 B2
(45) Date of Patent: Aug. 22, 2023

(54) METHOD FOR CALIBRATING SHORT TEMPERATURE MEASURING DEVICE USING DRY BODY TEMPERATURE CALIBRATOR

(71) Applicant: BEIJING CONST INSTRUMENTS TECHNOLOGY INC., Beijing (CN)

(72) Inventors: Shichun Zhao, Beijing (CN); Hongjun Gao, Beijing (CN); Chunying Zhang, Beijing (CN)

(73) Assignee: BEIJING CONST INSTRUMENTS TECHNOLOGY INC., Beijing (CN)

( * ) Notice: Subject to any disclaimer, the term of this patent is extended or adjusted under 35 U.S.C. 154(b) by 549 days.

(21) Appl. No.: 17/040,225

(22) PCT Filed: Jan. 17, 2019

(86) PCT No.: PCT/CN2019/072166
§ 371 (c)(1),
(2) Date: Sep. 22, 2020

(87) PCT Pub. No.: WO2019/179229
PCT Pub. Date: Sep. 26, 2019

(65) Prior Publication Data
US 2021/0010876 A1     Jan. 14, 2021

(30) Foreign Application Priority Data

Mar. 22, 2018    (CN) .......................... 201810238574.0

(51) Int. Cl.
*G01K 15/00*      (2006.01)
*F27D 21/00*      (2006.01)
(Continued)

(52) U.S. Cl.
CPC ....... *G01K 15/005* (2013.01); *F27D 21/0014* (2013.01); *G01K 7/16* (2013.01); *F27D 99/00* (2013.01)

(58) Field of Classification Search
CPC .... G01K 15/005; G01K 15/00; G01K 15/002; G01K 11/3213; G01K 11/32;
(Continued)

(56) References Cited

U.S. PATENT DOCUMENTS

2007/0289314 A1* 12/2007 Liebmann ............... F25B 21/04
374/1
2010/0037626 A1* 2/2010 Liebmann ............ G01K 15/005
374/1
(Continued)

FOREIGN PATENT DOCUMENTS

CN      103163910 A     6/2013
CN      204389421 U     6/2015
(Continued)

OTHER PUBLICATIONS

Apr. 28, 2019 Search Report issued in International Patent Application No. PCT/CN2019/072166.
(Continued)

*Primary Examiner* — Gail Kaplan Verbitsky
(74) *Attorney, Agent, or Firm* — Oliff PLC

(57) ABSTRACT

A method for calibrating a short temperature measuring device using a dry body temperature calibrator; wherein a heat soaking block is placed in the furnace of the dry body temperature calibrator, and two temperature measuring holes are in the heat soaking block, the bottom of the furnace includes a temperature control element. This method includes electrically connecting the first standard temperature sensor to the temperature control element through the measuring module and the control module sequentially to
(Continued)

form a closed-loop for temperature feedback control, accurately controlling the temperature of the temperature measuring hole, and calculating the temperature difference between the temperature sensor to be calibrated and the standard temperature sensor in the two temperature measuring holes respectively. Thus quick calculation for the actual temperature of the temperature measuring device to be calibrated and quick calibration for the accuracy of the temperature measuring device to be calibrated can be achieved.

20 Claims, 3 Drawing Sheets

(51) Int. Cl.
*G01K 7/16* (2006.01)
*F27D 99/00* (2010.01)

(58) Field of Classification Search
CPC ........ G01K 15/007; G01K 7/02; G01K 1/143; G01K 2219/00; G01K 3/10; G01K 7/021; G01K 7/023; G01K 7/12; G01K 7/16; G01K 19/00; G01K 17/00; F27D 21/0014; F27D 99/00
USPC .............................................................. 374/1
See application file for complete search history.

(56) References Cited

U.S. PATENT DOCUMENTS

| | | | |
|---|---|---|---|
| 2021/0123822 A1* | 4/2021 | Maunumäki | G01K 15/005 |
| 2022/0042861 A1* | 2/2022 | Gnessin | G01K 15/005 |

FOREIGN PATENT DOCUMENTS

| | | | | |
|---|---|---|---|---|
| CN | 205449333 U | | 8/2016 | |
| CN | 106500878 A | | 3/2017 | |
| CN | 206348089 U | | 7/2017 | |
| CN | 206479262 U | | 9/2017 | |
| DE | 20 2010 013 086 U1 | | 4/2011 | |
| EP | 2947439 A1 | * | 11/2015 | ........... G01K 15/002 |
| FR | 2920910 A1 | * | 3/2009 | ............. G01K 15/00 |
| FR | 2923604 A1 | * | 5/2009 | ........... G01K 15/002 |
| WO | WO-9904231 A1 | * | 1/1999 | ............. G01K 15/00 |
| WO | 2019137343 A1 | * | 7/2019 | ............. F27D 19/00 |
| WO | WO-2019137330 A1 | * | 7/2019 | ............. F27D 19/00 |

OTHER PUBLICATIONS

Sep. 22, 2020 International Preliminary Report on Patentability issued in International Patent Application No. PCT/CN2019/072166.

Nielsen J et al., "Disseminating the ITS-90 Traceability in Industry—An Intercomparison of Temperature Block Calibrators.", International Journal of Thermophysics; Journal of Thermophysical Properties and Thermophysics and Its Applications, vol. 32, No. 7-8, pp. 1485-1495, May 31, 2011.

EURAMET: "Calibration of Temperature Block Calibrators European Association of National Metrology Institutes.", https://www.euramet.org/Media/docs/Publications/calguides/EURAMET_cg-13_v3.0_Temperature_Block_Calibrators.pdf, Nov. 11, 2021, pp. 1-14.

Nov. 23, 2021 Extended European Search Report issued in Patent Application No. 19772266.3.

* cited by examiner

METHOD FOR CALIBRATING SHORT TEMPERATURE MEASURING DEVICE USING DRY BODY TEMPERATURE CALIBRATOR

TECHNICAL FIELD

The invention belongs to the field of temperature calibration, specifically relates to a method for calibrating short temperature measuring device using a dry body temperature calibrator.

BACKGROUND

Currently, portable dry body temperature calibrators are often used to calibrate the accuracy of conventional temperature measuring device. There are some special-sized temperature measuring devices in practice, i.e. short temperature measuring devices, such as short platinum resistance or thermocouple sensors, short or right-angle thermistor temperature sensors, etc. As shown in FIG. 1, due to the short length of this short temperature measuring device, the horizontal distance between the temperature measuring device to be calibrated 3 and the temperature sensing element 14 of the temperature sensor in the furnace 15 is large. The error would be large if the measured temperature by the temperature sensor in the furnace 15 is used as the actual temperature to calibrate the temperature measuring device to be calibrated 3.

Therefore, the technical problem on how to calibrate a short temperature measuring device more accurately needs to be solved at present.

SUMMARY

The invention provides a method for calibrating short temperature measuring device using a dry body temperature calibrator, which can calibrate a short temperature measuring device more accurately.

The present invention employs the following technical solutions.

The invention provides a method for calibrating a short temperature measuring device 3 using a dry body temperature calibrator 1, i.e. for calibrating the temperature measuring device to be calibrated 3, wherein a heat soaking block 12 is placed in a furnace of the dry body temperature calibrator 1 and a first temperature measuring hole 131 and a second temperature measuring hole 132 are provided in the heat soaking block 12, the method comprising the following steps:

Step S1: obtaining a temperature field model library of the heat soaking block 12 and storing the temperature field model library in memory of the dry body temperature calibrator 1;

Step S2: inserting a probe of a first standard temperature sensor 21 and a probe of the short temperature measuring device 3 into the first temperature measuring hole 131 and the second temperature measuring hole 132 of the heat soaking block 12 in the dry body temperature calibrator 1, respectively, keeping temperature of the first standard temperature sensor 21 at temperature T1, and obtaining measured temperature T1' of the short temperature measuring device 3;

Step S3: obtaining a temperature difference value $\Delta T1$ for the heat soaking block 12 at the temperature T1 according to the temperature field model library stored in the dry body temperature calibrator 1, wherein the temperature difference value $\Delta T1$ is the temperature difference value between position of the probe of the first standard temperature sensor 21 placed in the first temperature measuring hole 131 and position of the probe of the short temperature measuring device 3 placed in the second temperature measuring hole 132; and Step S4: calculating actual temperature $T1''=T1-\Delta T1$ at location of the probe of the short temperature measuring device 3, and comparing T1'' and T1' to calibrate the short temperature measuring device 3 at a single temperature point.

Optionally, the method further comprises after Step S4:

Step S5, keeping temperature of the first standard temperature sensor 21 at T2, T3, T4, ..., Tn respectively after T1, and repeating Steps S2 to S4 to calibrate the short temperature measuring device 3 at multiple temperature points, wherein the measured temperatures of the short temperature measuring device 3 are T1', T2', T3', T4', ..., Tn' respectively and the calculated actual temperatures are T2'', T3'', T4'', ..., Tn'' respectively.

Optionally, the first standard temperature sensor 21 is a thermal resistance.

Optionally, depth of the first temperature measuring hole 131 and/or the second temperature measuring hole 132 of the heat soaking block 12 is close to length of the short temperature measuring device 3.

Optionally, the first standard temperature sensor 21 is electrically connected to a temperature control element 16 of the dry body temperature calibrator 1 through a first measuring module 41 and a control module 5 in sequence, so as to form a closed-loop temperature feedback control loop.

Optionally, the first measuring module 41 and the control module 5 are integrated into one measurement control module.

Optionally, in the Step S1, the step for obtaining the temperature field model library comprising the following steps:

Step S11, inserting a probe of the first standard temperature sensor 21 and a probe of a second standard temperature sensor 22 into the first temperature measuring hole 131 and the second temperature measuring hole 132 of the heat soaking block 12 in the dry body temperature calibrator 1 respectively; keeping temperature of the first standard temperature sensor 21 at temperature T1, obtaining measured temperature T1''' of the second standard temperature sensor 22, and calculating temperature difference value $\Delta T1=T1'''-T1$ at T1; and Step S12, keeping temperature of the first standard temperature sensor 21 at T2, T3, T4, ..., Tn respectively after T1, repeating Step S11 to calculate the temperature difference values $\Delta T2$, $\Delta T3$, $\Delta T4$, ..., $\Delta Tn$ at different temperatures, establishing a temperature field model for the heat soaking block 12 and storing it in the memory of the dry body temperature calibrator 1.

Optionally, the method further comprises after the Step S12:

Step S13, replacing the heat soaking block 12 in the dry body temperature calibrator 1 with other types of heat soaking blocks, repeating Steps S11 to S12 to establish temperature field models of a plurality of heat soaking blocks 12 in the dry body temperature calibrator 1, and establishing a temperature field model library for a plurality of heat soaking blocks 12 in the dry body temperature calibrator 1 and storing it in the memory of the dry body temperature calibrator 1.

Optionally, the short temperature measuring device 3 and the second standard temperature sensor 22 are electrically connected to a second measuring module 42 independent of the first measuring module 41.

Optionally, depths of the temperature measuring holes of the heat soaking block 12 are less than ⅔ of height of the heat soaking block 12.

Based on the above technical solution, a method for calibrating a short temperature measuring device using a dry body temperature calibrator comprises obtaining the temperature difference between the first temperature measuring hole and the second temperature measuring hole when the first temperature measuring hole is at a specific temperature, and calibrating the temperature value measured by the short temperature measuring device in the second temperature measuring hole using the temperature difference when the first temperature measuring hole is at the same specific temperature, so as to calibrate the temperature value measured by the short temperature measuring device more accurately.

REFERENCE NUMERALS

1: Dry body temperature calibrator, 11: Thermostatic block, 12: Heat soaking block, 13: Temperature measuring hole, 131: First temperature measuring hole, 132: Second temperature measuring hole, 14: Temperature sensing element, 15: Temperature sensor in the furnace, 16: Temperature control element;
2: Standard temperature sensor, 21: First standard temperature sensor, 22: Second standard temperature sensor;
3: Temperature measuring device to be calibrated;
4: Measuring module, 41: First measuring module, 42: Second measuring module; 5: Control module.

DETAILED DESCRIPTION OF EMBODIMENTS

Existing methods for calibrating short temperature measuring device have a shortage that a short temperature measuring device cannot be accurately calibrated due to the uneven horizontal temperature field, the temperature difference between the standard temperature sensor and the temperature measuring device to be calibrated. In order to overcome the shortage mentioned above, the present invention provides a method for calibrating a short temperature measuring device using a dry body temperature calibrator. The method includes creating a temperature field model library of a plurality of heat soaking blocks applicable for the dry body temperature calibrator by calculating the temperature difference between a probe of a temperature measuring device to be calibrated and a probe of a standard temperature measuring device which are placed in two temperature measuring holes, respectively. Thus, a quick calculation of actual temperature of the temperature measuring device to be calibrated and calibration of the accuracy of the temperature measuring device to be calibrated can be achieved.

The method for calibrating the short temperature measuring device using the dry body temperature calibrator in the present invention will be described in detail below in conjunction with the drawings and specific embodiments.

Embodiment 1

The short temperature measuring device to be calibrated 3 of this embodiment is an element or device with a temperature measuring function, including but not limited to thermal resistance, thermocouple, temperature switch, temperature transducer, and the like.

Figure 1:
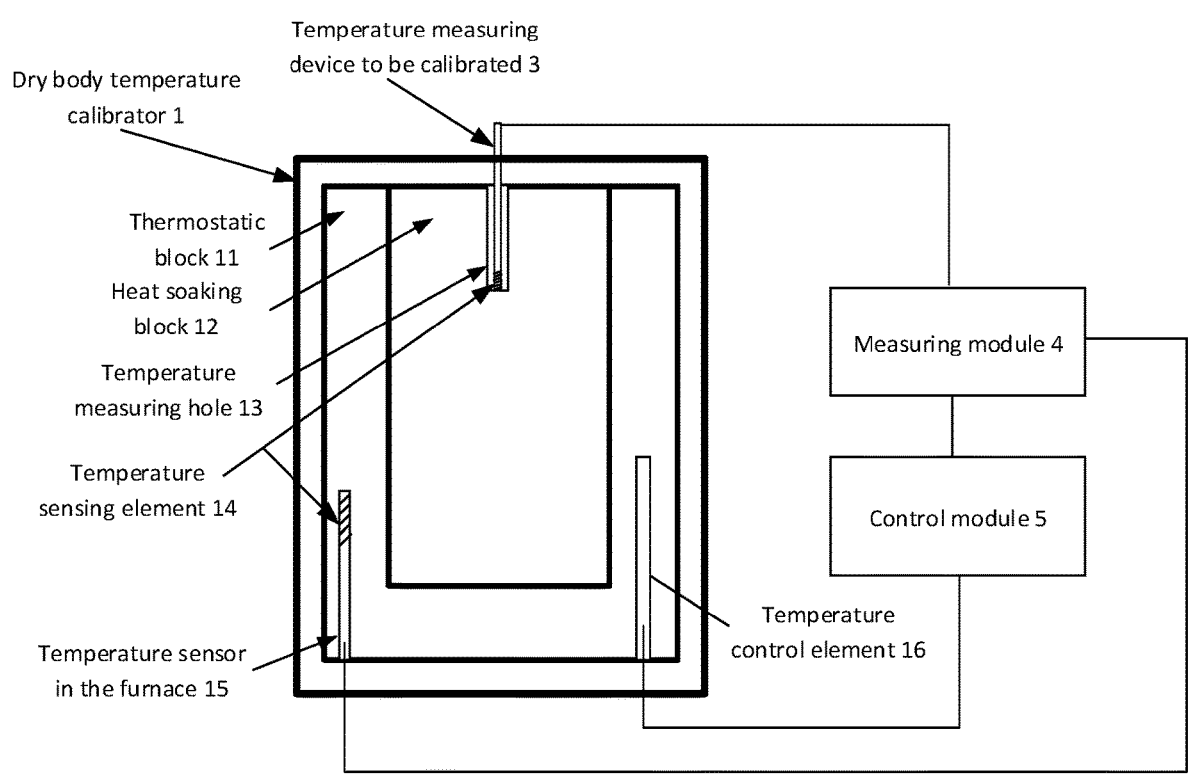
FIG. 1 is an illustrative drawing of the principle of an existing calibration method for the short temperature measuring device.
Figure 2:
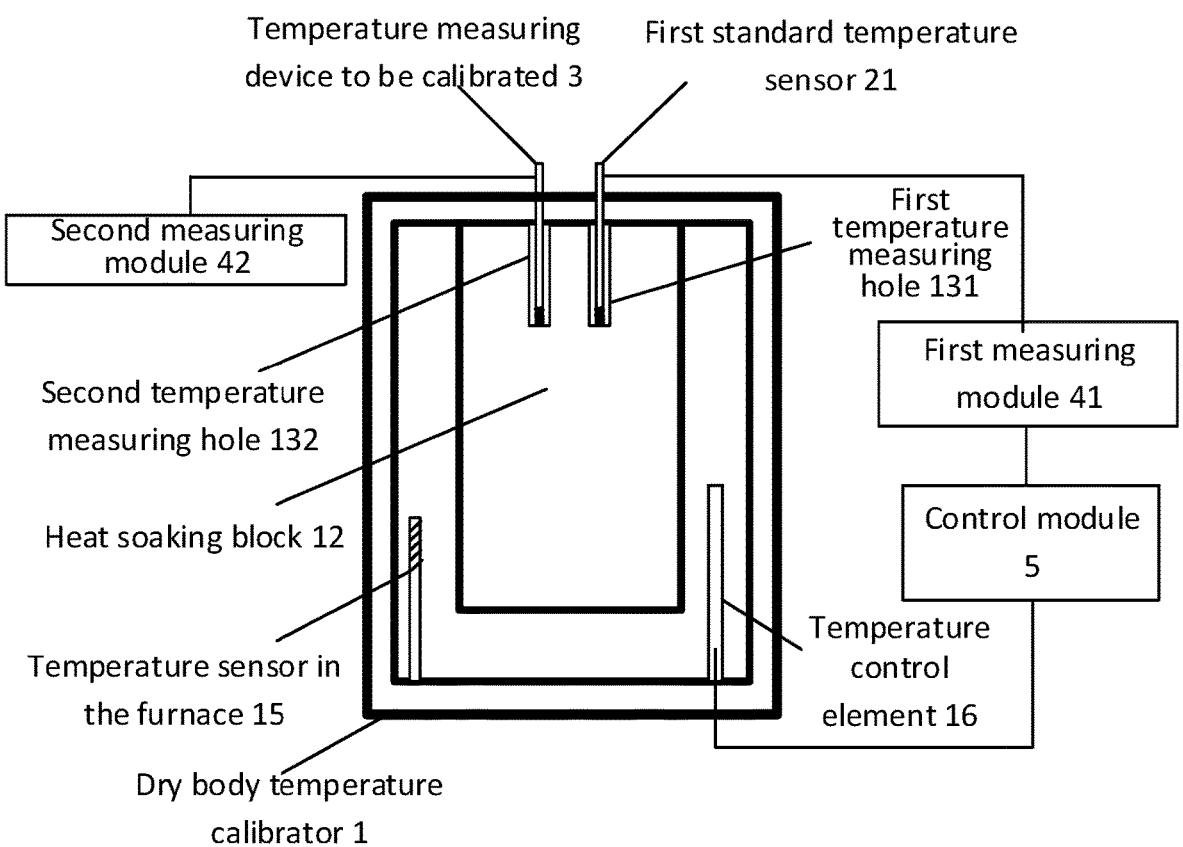
FIG. 2 is an illustrative drawing of the principle of the calibration method for the short temperature measuring device in according to the present invention.

This embodiment provides a method for calibrating a short temperature measuring device using the dry body temperature calibrator shown in FIG. 2 in order to calibrate a short temperature measuring device to be calibrated 3. A heat soaking block 12 is placed in the furnace of the dry body temperature calibrator 1. Two temperature measuring holes which are a first temperature measuring hole 131 and a second temperature measuring hole 132 respectively are provided in the heat soaking block 12. The method includes the following steps:

Step S1: obtaining a temperature field model library of the heat soaking block 12 and storing the temperature field model library in memory of the dry body temperature calibrator 1;

Step S2: inserting a probe of a first standard temperature sensor 21 and a probe of the temperature measuring device to be calibrated 3 into the first temperature measuring hole 131 and the second temperature measuring hole 132 of the heat soaking block 12 in the dry body temperature calibrator 1, respectively, keeping temperature of the first standard temperature sensor 21 at temperature T1, and obtaining measured temperature T1' of the temperature measuring device to be calibrated 3;

Step S3: obtaining a temperature difference value ΔT1 for the heat soaking block 12 at the temperature T1 according to the temperature field model library stored in the dry body temperature calibrator 1, wherein the temperature difference value ΔT1 is the temperature difference value between position of the probe of the first standard temperature sensor 21 placed in the first temperature measuring hole 131 and position of the probe of the short temperature measuring device 3 placed in the second temperature measuring hole 132; and Step S4: calculating actual temperature T1"=T1−ΔT1 at location of the probe of the temperature measuring device to be calibrated 3, and comparing T1" and T1' to calibrate the temperature measuring device to be calibrated 3 at a single temperature point.

In the embodiment of the present invention, keeping the temperature of the first standard temperature sensor 21 at T1 may include keeping the temperature of the probe of the first standard temperature sensor 21 at T1 by means of observing the measurement result of the first standard temperature sensor 21 continuously. This can be achieved by a temperature control element 16 at the bottom.

In an embodiment, the method further includes after Step S4:

Step S5, keeping temperature of the first standard temperature sensor 21 at T2, T3, T4, . . . , Tn respectively after T1, and repeating Steps S2 to S4 to calibrate the temperature measuring device to be calibrated 3 at multiple temperature points, wherein the measured temperatures of the temperature measuring device to be calibrated 3 are T1', T2', T3', T4', . . . , Tn' respectively and the calculated actual temperatures are T2", T3", T4", . . . , Tn" respectively.

In an embodiment, the first standard temperature sensor 21 is a thermal resistance.

In an embodiment, depth of the first temperature measuring hole 131 and/or the second temperature measuring hole 132 of the heat soaking block 12 is close to length of the temperature measuring device to be calibrated 3.

Specifically, the depth of the first temperature measuring hole 131 and/or the second temperature measuring hole 132 may be provided to be equal to or less than the length of the temperature measuring device to be calibrated 3.

In an embodiment, the first standard temperature sensor 21 is electrically connected to a temperature control element 16 of the dry body temperature calibrator 1 through a first measuring module 41 and a control module 5 in sequence, so as to form a closed-loop temperature feedback control loop.

In an embodiment, the first measuring module 41 and the control module 5 are integrated into one measurement control module.

In an embodiment, in the Step S1, the step for obtaining the temperature field model library comprising the following steps:

Step S11, inserting a probe of the first standard temperature sensor 21 and a probe of a second standard temperature sensor 22 into the first temperature measuring hole 131 and the second temperature measuring hole 132 of the heat soaking block 12 in the dry body temperature calibrator 1 respectively; keeping temperature of the first standard temperature sensor 21 at temperature T1, obtaining measured temperature T1''' of the second standard temperature sensor 22, and calculating temperature difference value $\Delta T1=T1'''-T1$ at T1; and Step S12, keeping temperature of the first standard temperature sensor 21 at T2, T3, T4, . . . , Tn respectively after T1, repeating Step S11 to calculate the temperature difference values $\Delta T2, \Delta T3, \Delta T4, \ldots, \Delta Tn$ at different temperatures, establishing a temperature field model for the heat soaking block 12 and storing it.

In an embodiment, the method further includes after step S12:

Step S13, replacing the heat soaking block 12 in the dry body temperature calibrator 1 with other types of heat soaking blocks, repeating Steps S11 to S12 to establish temperature field models of a plurality of heat soaking blocks 12 in the dry body temperature calibrator 1, and establishing a temperature field model library for a plurality of heat soaking blocks 12 in the dry body temperature calibrator 1 and storing it in the memory of the dry body temperature calibrator 1.

In an embodiment, the temperature measuring device to be calibrated 3 and the second standard temperature sensor 22 are electrically connected to a second measuring module 42 that is independent of the first measuring module 41.

In an embodiment, depths of the temperature measuring holes of the heat soaking block 12 is less than $2/3$ of the height of the heat soaking block 12.

The method for calibrating a short temperature measuring device using a dry body temperature calibrator in this embodiment includes obtaining the temperature difference between the first temperature measuring hole and the second temperature measuring hole when the first temperature measuring hole is kept at a specific temperature, and calibrating the temperature value measured by the short temperature measuring device in the second temperature measuring hole by means of the temperature difference when the first temperature measuring hole is at the same specific temperature, so as to calibrate the temperature value measured by the short temperature measuring device more accurately.

Embodiment 2

The short temperature measuring device to be calibrated 3 described in FIG. 2 is an element or device with a temperature measuring function, including but not limited to thermal resistance, thermocouple, temperature switch, temperature transducer, and the like.

This embodiment provides a method for calibrating short temperature measuring device using a dry body temperature calibrator in order to overcome the defect that the prior art cannot accurately calibrate short temperature measuring device. As shown in FIG. 2, the method includes the following steps:

Step S1: obtaining a temperature field model library of the dry body temperature calibrator 1 and store it in the memory of the dry body temperature calibrator 1;

Step S2: inserting a probe of a first standard temperature sensor 21 and a probe of the temperature measuring device to be calibrated 3 into the first temperature measuring hole 131 and the second temperature measuring hole 132 of a specified heat soaking block 12 of the dry body temperature calibrator 1, respectively, keeping temperature of the first standard temperature sensor 21 at temperature T1, and obtaining measured temperature T1' of the temperature measuring device to be calibrated 3;

Step S3: obtaining a temperature difference value $\Delta T1$ for the heat soaking block 12 at the temperature T1 according to the temperature field model library stored in the dry body temperature calibrator 1, wherein the temperature difference value $\Delta T1$ is the temperature difference value between position of the probe of the first standard temperature sensor 21 placed in the first temperature measuring hole 131 and position of the probe of the temperature measuring device to be calibrated 3 placed in the second temperature measuring hole 132;

Step S4: calculating actual temperature $T1''=T1-\Delta T1$ at location of the probe of the temperature measuring device to be calibrated 3, and comparing T1'' and T1' to calibrate the temperature measuring device to be calibrated 3 at a single temperature point; and Step S5, keeping temperature of the first standard temperature sensor 21 at T2, T3, T4, . . . , Tn respectively after T1, and repeating Steps S2 to S4 to calibrate the temperature measuring device to be calibrated 3 at multiple temperature points, wherein the measured temperatures of the temperature measuring device to be calibrated 3 are T1', T2', T3', T4', . . . , Tn' respectively and the calculated actual temperatures are T2'', T3'', T4'', . . . , Tn'' respectively.

In the above step S2, both the first standard temperature sensor 21 and the temperature measuring device to be calibrated 3 may be thermocouples or thermal resistors, and the first standard temperature sensor 21 and the temperature measuring device to be calibrated 3 are both short temperature measuring devices. The type of the heat soaking block 12 is selected according to the specific lengths of the first standard temperature sensor 21 and the temperature measuring device to be calibrated 3. Preferably, the heat soaking block 12 having temperature measuring hole with the closest depth to the length of the temperature measuring device to be calibrated 3 is selected. Since the first standard temperature sensor 21 and the temperature measuring device to be calibrated 3 are both short temperature measuring devices and the depth of the temperature measuring hole 13 of the heat soaking block 12 is small, the horizontal temperature field in the heat soaking block 12 is not even. There is a temperature difference ΔT between the actual temperatures in the two temperature measuring holes.

The first standard temperature sensor 21 is connected to the temperature control element 16 of the dry body temperature calibrator 1 through the first measuring module 41 and the control module 5 in sequence to form a closed-loop temperature feedback control loop. The first measuring module 41 is used to measure the temperature of the probe of the first standard temperature sensor 21 (that is, obtained by measuring the temperature in the first temperature measuring hole 131). The output signal of the control module 5 is transmitted to the temperature control element 16 of the dry body temperature calibrator 1 in order to control the power output by the temperature control element of the dry body temperature calibrator 1, and further control the temperature in the first temperature measuring hole 131 of the dry body temperature calibrator 1. The control module 5 generates a heating power signal for controlling the dry body temperature calibrator 1 according to the temperature result measured by the first measuring module 41, so that the temperature at the first standard temperature sensor 21 is kept at a set value, i.e. T1.

The first measuring module 41 and the control module 5 may be separated modules, or may be integrated into one measurement control module.

The temperature measuring device to be calibrated 3 is electrically connected to the second measuring module 42. The second measuring module 42 measures the temperature of the probe of the temperature measuring device to be calibrated 3 as T1′, that is, the temperature in the second temperature measuring hole 132.

Figure 3:
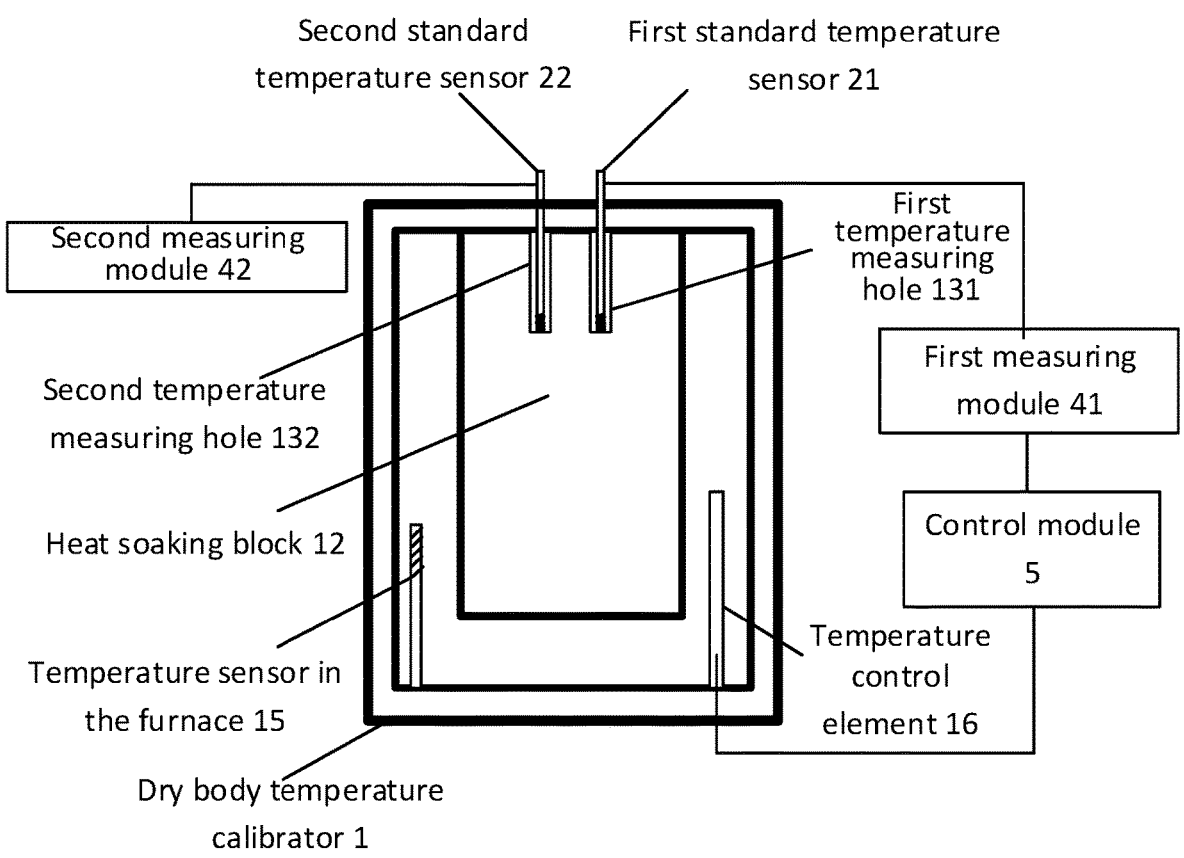
FIG. 3 is an illustrative drawing of the method for establishing the temperature field model library in according to the present invention.

In step S1, the step for obtaining the temperature field model library includes the following steps (refer to FIG. 3): Step S11, inserting a probe of the first standard temperature sensor 21 and a probe of a second standard temperature sensor 22 into the first temperature measuring hole 131 and the second temperature measuring hole 132 of the heat soaking block 12 in the dry body temperature calibrator 1 respectively; keeping temperature of the first standard temperature sensor 21 at temperature T1, obtaining measured temperature T1′″ of the second standard temperature sensor 22, and calculating temperature difference value ΔT1=T1′″−T1 at T1;

Step S12, keeping temperature of the first standard temperature sensor 21 at T2, T3, T4, . . . , Tn respectively after T1, repeating Step S11 to calculate the temperature difference values ΔT2, ΔT3, ΔT4, . . . , ΔTn at different temperatures, establishing a temperature field model for the heat soaking block 12 of the dry body temperature calibrator 1;

Step S13, replacing the heat soaking block 12 in the dry body temperature calibrator 1 with other types of heat soaking blocks, repeating Steps S11 to S12 to establish temperature field models of a plurality of heat soaking blocks 12 of the dry body temperature calibrator 1, and establishing a temperature field model library for a plurality of heat soaking blocks 12 of the dry body temperature calibrator 1.

In step S11, both the first standard temperature sensor 21 and the second standard temperature sensor 22 can be thermocouples or thermal resistors.

In step S13, the hole depths of the temperature measuring holes of different types of heat soaking blocks 12 are different. For example, the hole depths may range from 4 mm to 50 mm, and may specifically be 4 mm, 6 mm, 8 mm, 10 mm, or 50 mm.

The method for calibrating a short temperature sensor using a dry body temperature calibrator provided by the present disclosure has the following beneficial effects:

(1) The temperature difference between the temperature measuring device to be calibrated and the standard temperature sensor placed in the two temperature measuring holes is calculated, so as to accurately calculate the actual temperature of the temperature measuring device to be calibrated, and then accurately calibrate the accuracy of the temperature measuring device to be calibrated.

(2) A temperature field model applicable for a single heat soaking block 12 of the dry body temperature calibrator 1 is established, and a temperature field model library applicable for a plurality of heat soaking blocks 12 of the dry body temperature calibrator 1 is established, so as to quickly calculate the actual temperature of the temperature measuring device to be calibrated and quickly calibrate the accuracy of the temperature measuring device to be calibrated. The method has a wide application range and provides high calibration efficiency and high calibration accuracy. It is applicable for the calibration for various short temperature measuring devices.

The embodiments of the present invention establish the temperature field model library of a plurality of heat soaking blocks applicable for the dry body temperature calibrator by calculating the temperature difference between the two temperature measuring holes where the probe of the temperature measuring device to be calibrated and the probe of the standard temperature sensor are placed respectively. Thus quick calculation for the actual temperature of the temperature measuring device to be calibrated and quick calibration for the accuracy of the temperature measuring device to be calibrated can be achieved. The method of the embodiment of the present invention has a wide application range, high calibration efficiency and high calibration accuracy, and is applicable for the calibration for various short temperature measuring devices.

Those skilled in the art should understand that these embodiments or examples are illustrative only but not intended to limit the scope of the present invention, and all the equivalent variations and modifications of the present invention will fall into the scope of the present invention.

What is claimed is:

1. A method for calibrating a short temperature measuring device using a dry body temperature calibrator, wherein a heat soaking block is placed in a furnace of the dry body temperature calibrator and a first temperature measuring hole and a second temperature measuring hole are provided in the heat soaking block, the method comprising the following steps:

Step S1: obtaining a temperature field model library of the heat soaking block and storing the temperature field model library in memory of the dry body temperature calibrator;

Step S2: inserting a probe of a first standard temperature sensor and a probe of the short temperature measuring device into the first temperature measuring hole and the second temperature measuring hole of the heat soaking block in the dry body temperature calibrator, respectively, keeping temperature of the first standard temperature sensor at temperature T1, and obtaining measured temperature T1′ of the short temperature measuring device;

Step S3: obtaining a temperature difference value ΔT1 for the heat soaking block at the temperature T1 according to the temperature field model library stored in the dry body temperature calibrator, wherein the temperature difference value ΔT1 is the temperature difference value between position of the probe of the first standard temperature sensor placed in the first temperature measuring hole and position of the probe of the short temperature measuring device placed in the second temperature measuring hole; and Step S4: calculating actual temperature T1″=T1+ΔT1 at location of the probe of the short temperature measuring device, and comparing T1″ and T1′ to calibrate the short temperature measuring device at a single temperature point.

2. The method according to claim 1, further comprising after Step S4:

Step S5, keeping temperature of the first standard temperature sensor at T2, T3, T4, . . . , Tn respectively after T1, and repeating Steps S2 to S4 to calibrate the short temperature measuring device at multiple temperature points, wherein the measured temperatures of the short temperature measuring device are T1′, T2′, T3′, T4′, . . . , Tn′ respectively and the calculated actual temperatures are T2″, T3″, T4″, . . . , Tn″ respectively.

3. The method according to claim 1, wherein the first standard temperature sensor is a thermal resistance.

4. The method according to claim 1, wherein depth of the first temperature measuring hole and/or the second temperature measuring hole of the heat soaking block and length of the short temperature measuring device are equal.

5. The method according to claim 4, wherein the first standard temperature sensor is electrically connected to a temperature control element of the dry body temperature calibrator through a first measuring module and a control module in sequence, so as to form a closed-loop temperature feedback control loop, wherein in the Step S1, the step for obtaining the temperature field model library comprising the following steps:

Step S11, inserting a probe of the first standard temperature sensor and a probe of a second standard temperature sensor into the first temperature measuring hole and the second temperature measuring hole of the heat soaking block in the dry body temperature calibrator respectively; keeping temperature of the first standard temperature sensor at temperature T1, obtaining measured temperature T1‴ of the second standard temperature sensor, and calculating temperature difference value ΔT1=T1‴−T1 at T1; and Step S12, keeping temperature of the first standard temperature sensor at T2, T3, T4, . . . , Tn respectively after T1, repeating Step S11 to calculate the temperature difference values ΔT2, ΔT3, ΔT4, . . . , ΔTn at different temperatures, establishing a temperature field model for the heat soaking block and storing it in the memory of the dry body temperature calibrator, and wherein depths of the first temperature measuring hole and the second temperature measuring hole of the heat soaking block are less than ⅔ of height of the heat soaking block.

6. The method according to claim 1, wherein the first standard temperature sensor is electrically connected to a temperature control element of the dry body temperature calibrator through a first measuring module and a control module in sequence, so as to form a closed-loop temperature feedback control loop.

7. The method according to claim 6, wherein the first measuring module and the control module are integrated into one measurement control module.

8. The method according to claim 6, wherein in the Step S1, the step for obtaining the temperature field model library comprising the following steps:

Step S11, inserting a probe of the first standard temperature sensor and a probe of a second standard temperature sensor into the first temperature measuring hole and the second temperature measuring hole of the heat soaking block in the dry body temperature calibrator respectively; keeping temperature of the first standard temperature sensor at temperature T1, obtaining measured temperature T1‴ of the second standard temperature sensor, and calculating temperature difference value ΔT1=T1‴−T1 at T1; and Step S12, keeping temperature of the first standard temperature sensor at T2, T3, T4, . . . , Tn respectively after T1, repeating Step S11 to calculate the temperature difference values ΔT2, ΔT3, ΔT4, . . . , ΔTn at different temperatures, establishing a temperature field model for the heat soaking block and storing it in the memory of the dry body temperature calibrator.

9. The method according to claim 8, further comprising after the Step S12:

Step S13, replacing the heat soaking block in the dry body temperature calibrator with other types of heat soaking blocks, repeating Steps S11 to S12 to establish temperature field models of a plurality of heat soaking blocks in the dry body temperature calibrator, and establishing a temperature field model library for a plurality of heat soaking blocks in the dry body temperature calibrator and storing it in the memory of the dry body temperature calibrator.

10. The method according to claim 8, wherein the short temperature measuring device and the second standard temperature sensor are electrically connected to a second measuring module independent of the first measuring module.

11. The method according to claim 1, wherein depths of the first temperature measuring hole and the second temperature measuring hole of the heat soaking block are less than ⅔ of height of the heat soaking block.

12. The method according to claim 2, wherein the first standard temperature sensor is electrically connected to a temperature control element of the dry body temperature calibrator through a first measuring module and a control module in sequence, so as to form a closed-loop temperature feedback control loop, and wherein the first measuring module and the control module are integrated into one measurement control module.

13. The method according to claim 12, wherein in the Step S1, the step for obtaining the temperature field model library comprising the following steps:

Step S11, inserting a probe of the first standard temperature sensor and a probe of a second standard temperature sensor into the first temperature measuring hole and the second temperature measuring hole of the heat soaking block in the dry body temperature calibrator respectively; keeping temperature of the first standard temperature sensor at temperature T1, obtaining measured temperature T1‴ of the second standard temperature sensor, and calculating temperature difference value ΔT1=T1‴−T1 at T1; and Step S12, keeping temperature of the first standard temperature sensor at T2, T3, T4, . . . , Tn respectively after T1, repeating Step S11 to calculate the temperature difference values ΔT2, ΔT3, ΔT4, . . . , ΔTn at different temperatures, establishing a temperature field model for the heat soaking block and storing it in the memory of the dry body temperature calibrator.

14. The method according to claim 13, further comprising after the Step S12:

Step S13, replacing the heat soaking block in the dry body temperature calibrator with other types of heat soaking blocks, repeating Steps S11 to S12 to establish temperature field models of a plurality of heat soaking blocks in the dry body temperature calibrator, and establishing a temperature field model library for a plurality of heat soaking blocks in the dry body temperature calibrator and storing it in the memory of the dry body temperature calibrator.

15. The method according to claim 14, wherein the short temperature measuring device and the second standard temperature sensor are electrically connected to a second measuring module independent of the first measuring module.

16. The method according to claim 4, wherein the first standard temperature sensor is electrically connected to a temperature control element of the dry body temperature calibrator through a first measuring module and a control module in sequence, so as to form a closed-loop temperature feedback control loop, and wherein the first measuring module and the control module are integrated into one measurement control module.

17. The method according to claim 16, wherein in the Step S1, the step for obtaining the temperature field model library comprising the following steps:

Step S11, inserting a probe of the first standard temperature sensor and a probe of a second standard temperature sensor into the first temperature measuring hole and the second temperature measuring hole of the heat soaking block in the dry body temperature calibrator respectively; keeping temperature of the first standard temperature sensor at temperature T1, obtaining measured temperature T1''' of the second standard temperature sensor, and calculating temperature difference value $\Delta T1 = T1''' - T1$ at T1; and Step S12, keeping temperature of the first standard temperature sensor at T2, T3, T4, ..., Tn respectively after T1, repeating Step S11 to calculate the temperature difference values $\Delta T2, \Delta T3, \Delta T4, ..., \Delta Tn$ at different temperatures, establishing a temperature field model for the heat soaking block and storing it in the memory of the dry body temperature calibrator.

18. The method according to claim 17, further comprising after the Step S12:

Step S13, replacing the heat soaking block in the dry body temperature calibrator with other types of heat soaking blocks, repeating Steps S11 to S12 to establish temperature field models of a plurality of heat soaking blocks in the dry body temperature calibrator, and establishing a temperature field model library for a plurality of heat soaking blocks in the dry body temperature calibrator and storing it in the memory of the dry body temperature calibrator.

19. The method according to claim 18, wherein the short temperature measuring device and the second standard temperature sensor are electrically connected to a second measuring module independent of the first measuring module.

20. The method according to claim 17, wherein depths of the first temperature measuring hole and the second temperature measuring hole of the heat soaking block are less than ⅔ of height of the heat soaking block.

* * * * *